(12) United States Patent
Saen et al.

(10) Patent No.: US 9,935,500 B2
(45) Date of Patent: Apr. 3, 2018

(54) COIL UNIT, WIRELESS POWER FEEDING DEVICE, WIRELESS POWER RECEIVING DEVICE, AND WIRELESS POWER TRANSMISSION DEVICE

(71) Applicant: TDK CORPORATION, Tokyo (JP)

(72) Inventors: Tsunehiro Saen, Tokyo (JP); Tetsuya Nishiyama, Tokyo (JP); Mitsunari Suzuki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 167 days.

(21) Appl. No.: 15/049,738

(22) Filed: Feb. 22, 2016

(65) Prior Publication Data

US 2016/0261146 A1    Sep. 8, 2016

(30) Foreign Application Priority Data

Feb. 24, 2015 (JP) ................................. 2015-034166
Feb. 10, 2016 (JP) ................................. 2016-023726

(51) Int. Cl.
  *H01F 38/14*    (2006.01)
  *H02J 50/12*    (2016.01)

(52) U.S. Cl.
  CPC .............. *H02J 50/12* (2016.02); *H01F 38/14* (2013.01)

(58) Field of Classification Search
  None
  See application file for complete search history.

(56) References Cited

U.S. PATENT DOCUMENTS

| 9,524,823 B2 | 12/2016 | Miyashita et al. | |
| 2005/0184848 A1* | 8/2005 | Yoshida | H01F 17/0013 336/223 |
| 2009/0243397 A1* | 10/2009 | Cook | H02J 5/005 307/104 |
| 2014/0175899 A1* | 6/2014 | Miyashita | H01F 38/14 307/104 |

FOREIGN PATENT DOCUMENTS

| JP | 2010-093180 A | 4/2010 |
| WO | 2013/065324 A1 | 5/2013 |

* cited by examiner

*Primary Examiner* — Jared Fureman
*Assistant Examiner* — Joel Barnett
(74) *Attorney, Agent, or Firm* — Oliff PLC (57) ABSTRACT

A coil unit, a wireless power feeding device, a wireless power receiving device, and a wireless power transmission device are provided that can reduce high induced voltage on the metal part. A coil unit includes a power transmission coil, reactance circuits and that each form a resonant circuit together with the power transmission coil, and a metal part disposed on the same side as the back side of the power transmission coil. A ratio between a first reactance value of the first reactance circuit and a second reactance value of the second reactance circuit is set based on the ratio of the mean distance between the winding and the metal part in a part of the winding from the other end to the central portion to the mean distance between the winding and the metal part in a part of the winding from one end to the central portion.

5 Claims, 4 Drawing Sheets

COIL UNIT, WIRELESS POWER FEEDING DEVICE, WIRELESS POWER RECEIVING DEVICE, AND WIRELESS POWER TRANSMISSION DEVICE

BACKGROUND

The present invention relates to a coil unit, a wireless power feeding device, a wireless power receiving device, and a wireless power transmission device.

Recent years have seen growing attention in the fields of electric vehicles and mobile devices to wireless power transmission technologies that wirelessly supply electric power from external sources without use of power cables. When such wireless power transmission technologies are used for chargers that require large power transmission, such as those used in electric vehicles, a large current needs to be passed through the power transmitting coil, leading to an increase in leakage flux. This may cause adverse effects on nearby electronics, such as electromagnetic interference.

To address this problem, for example, Patent Reference 1 discloses a contactless power feeding device whose primary and secondary sides each include the following components arranged in the order given below, as viewed from the air gap: a coil with a flat structure wound in a spiral shape, a ferrite core having a flat planar shape, and an aluminum plate having a flat planar shape. The aluminum plate blocks exposure of leakage flux to the outside.

CITED REFERENCES

Patent Reference

[Patent Reference 1] Japanese Unexamined Patent Application Publication No. 2010-93180

SUMMARY

In the field of wireless power transmission technologies, systems that utilize the resonance (sympathetic resonance) phenomenon are becoming mainstream. Compared with electromagnetic induction, use of the resonance phenomenon has an advantage of allowing the distance between the power transmitting and receiving sides to be increased. Such wireless power transmission technologies using the resonance phenomenon require that a reactance circuit for generating resonance be connected to either the starting edge or end edge of the winding of the power transmission coil. However, if such a reactance circuit for generating resonance is connected to only one of the starting edge and end edge of the winding of the power transmission coil, a potential difference develops between the starting edge and end edge of the winding of the power transmission coil. Consequently, a high induced voltage to ground is generated on the metal part owing to the developed potential difference via a parasitic capacitance.

The present invention has been made in view of the above-mentioned problem, and accordingly it is an object of the present invention to provide a coil unit, a wireless power feeding device, a wireless power receiving device, and a wireless power transmission device that are capable of reducing high voltage induced on the metal part.

A coil unit according to the present invention includes a power transmission coil, a reactance circuit that forms a resonant circuit together with the power transmission coil, and a metal part disposed on the same side as a back side of the power transmission coil. The reactance circuit has a first reactance circuit connected to one end of a winding the power transmission coil, and a second reactance circuit connected to another end of the winding of the power transmission coil. A ratio of a second reactance value of the second reactance circuit to a first reactance value of the first reactance circuit is set based on a ratio of a mean distance between the winding and the metal part in a part of the winding from the one end to a central portion to a mean distance between the winding and the metal part in a part of the winding from the other end to the central portion.

According to the present invention, the reactance circuit has the first reactance circuit connected to one end of the winding of the power transmission coil, and the second reactance circuit connected to the other end of the winding of the power transmission coil. The ratio of the second reactance value of the second reactance circuit to the first reactance value of the first reactance circuit is set based on the ratio of the mean distance between the winding and the metal part in the part of the winding from the other end to the central portion to the mean distance between the winding and the metal part in the part of the winding from the one end to the central portion. This results in a smaller difference between the value of voltage induced on the metal part via the parasitic capacitance created between the winding and the metal part in the part of the winding of the power transmission coil from the one end to the central portion, and the value of voltage applied across the first reactance circuit, and a smaller difference between the value of voltage induced on the metal part via the parasitic capacitance created between the winding and the metal part in the part of the winding of the power transmission coil from the other end to the central portion, and the value of voltage applied across the second reactance circuit. As a result, high voltage induced on the metal part can be reduced.

Preferably, a ratio M of the second reactance value to the first reactance value is set so as to satisfy Equations (1) and (2) below:

$$M=(1+\alpha)/(1-\alpha) \quad \text{Equation (1)}$$

$$\alpha=\{(n-1)/(n+1)\}\cdot(f/f_0)^2 \quad \text{Equation (2)}$$

where n denotes the ratio of the mean distance between the winding and the metal part in the part of the winding from the other end to the central portion to the mean distance between the winding and the metal part in the part of the winding from the one end to the central portion, f denotes a frequency of an alternating current that passes through the power transmission coil during power transmission, and $f_0$ denotes a resonance frequency of the resonant circuit.

In this case, the difference between the value of voltage induced on the metal part via the parasitic capacitance created between the winding and the metal part in the part of the winding of the power transmission coil from one end to the central portion, and the value of voltage applied across the first reactance circuit approaches zero without limit, and the difference between the value of voltage induced on the metal part via the parasitic capacitance created between the winding and the metal part in the part of the winding of the power transmission coil from the other end to the central portion, and the value of voltage applied across the second reactance circuit approaches zero without limit. As a result, high voltage induced on the metal part can be further reduced.

More preferably, the winding of the power transmission coil is wound continuously in a layered manner. In this case, the inductance value of the coil can be improved while reducing high voltage induced on the metal part.

A wireless power feeding device according to the present invention includes a power feeding coil unit, and the power feeding coil unit is the coil unit mentioned above. The present invention can provide a wireless power feeding device that makes it possible to reduce high induced voltage on the metal part.

A wireless power receiving device according to the present invention includes a power receiving coil unit, and the power receiving coil unit is the coil unit mentioned above. The present invention can provide a wireless power receiving device that makes it possible to reduce high induced voltage on the metal part.

A wireless power transmission device according to the present invention includes a wireless power feeding device having a power feeding coil unit, and a wireless power receiving device having a power receiving coil unit. At least one of the power feeding coil unit and the power receiving coil unit is the coil unit mentioned above. The present invention can provide a wireless power transmission device that makes it possible to reduce high induced voltage on the metal part.

The present invention can provide a coil unit, a wireless power feeding device, a wireless power receiving device, and a wireless power transmission device that are capable of reducing high voltage induced on the metal part.

DETAILED DESCRIPTION OF EMBODIMENTS

Modes for carrying out the present invention (embodiments) will be described in detail with reference to the drawings. In the following description, identical elements or elements having identical functions are denoted by using the same reference signs, and repetitive description is omitted.

Figure 1:
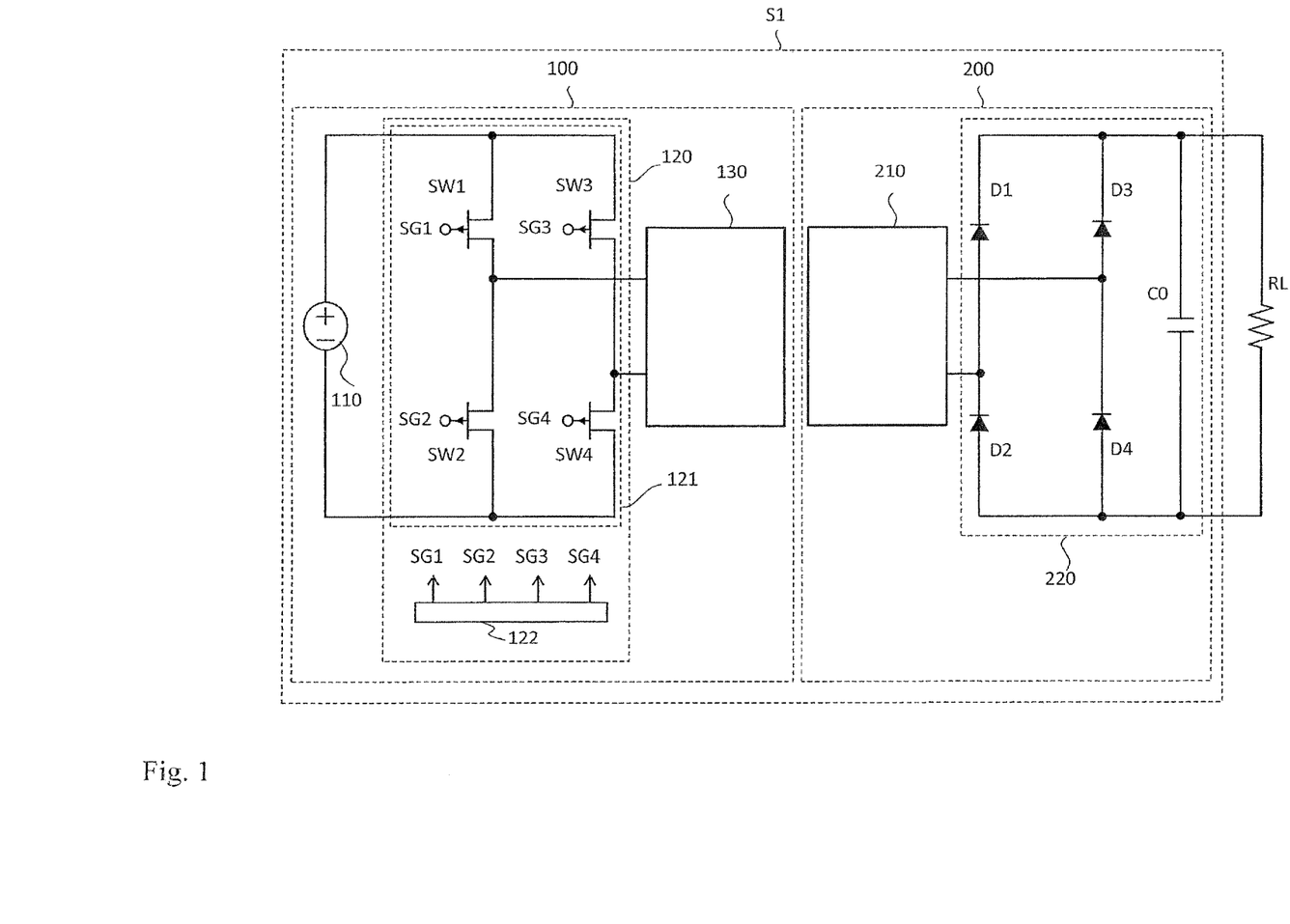
FIG. 1 is a circuit configuration diagram illustrating, together with a load, a wireless power transmission device employing a coil unit according to a preferred embodiment of the present invention.

First, referring to FIG. 1, the general configuration of a wireless power transmission device S1 employing a coil unit according to a preferred embodiment of the present invention will be described. FIG. 1 is a circuit configuration diagram illustrating, together with a load, a wireless power transmission device employing a coil unit according to a preferred embodiment of the present invention. The coil unit according to a preferred embodiment of the present invention may be employed for both a power feeding coil unit and a power receiving coil unit in the wireless power transmission device.

The wireless power transmission device S1 has a wireless power feeding device 100, and a wireless power receiving device 200 as illustrated in FIG. 1.

The wireless power feeding device 100 has a power source 110, a power conversion circuit 120, and a power feeding coil unit 130. The power source 110 supplies direct-current (DC) power to the power conversion circuit 120. The power source 110 is not particularly limited as long as the power source 110 outputs DC power. Examples of such a power source include a DC power source obtained through rectification/smoothing of a commercial alternating-current (AC) power source, a secondary battery, a DC power source obtained through photovoltaic power generation, and a switching power supply such as a switching converter.

The power conversion circuit 120 has a power conversion section 121, and a switch driving section 122. The power conversion circuit 120 has the function of converting input DC power supplied from the power source 110 into AC power. More specifically, the power conversion section 121 is constructed of a switching circuit with a plurality of switching elements connected in a bridge configuration. In this embodiment, the power conversion section 121 is a full-bridge circuit using four switching elements SW1 to SW4. Examples of the switching elements SW1 to SW4 include elements such as MOS-FETs (Metal Oxide Semiconductor-Field Effect Transistors) and IGBTs (Insulated Gate Bipolar Transistors). The switching elements SW1 to SW4 are respectively controlled to be On/Off in accordance with SW control signals SG1 to SG4 supplied from the switch driving section 122, thus converting input DC power supplied from the power source 110 into AC power.

The power feeding coil unit 130 has the function of feeding AC power supplied from the power conversion circuit 120 to a power receiving coil unit 210 described later. If the wireless power transmission device S1 according to this embodiment is used as equipment for feeding power to a vehicle such as an electric vehicle, the power feeding coil unit 130 is disposed underground or near the ground.

The wireless power receiving device 200 has the power receiving coil unit 210, and a rectification section 220.

The power receiving coil unit 210 has the function of receiving AC power fed from the power feeding coil unit 130. If the wireless power transmission device S1 according to this embodiment is used as equipment for feeding power to a vehicle such as an electric vehicle, the power receiving coil unit 210 is disposed in a lower part of the vehicle.

The rectification section 220 rectifies the power received by the power receiving coil unit 210, and outputs the rectified power to a load RL. In this embodiment, the rectification section 220 includes a bridge circuit with four diodes (rectifying elements) D1 to D4 connected in a full-bridge configuration, and a smoothing capacitor C0 connected in parallel to this bridge circuit. That is, the rectification section 220 has the function of full-wave rectifying the AC power supplied from the power receiving coil unit 210. The smoothing capacitor C0 smoothes the rectified voltage to produce a DC voltage.

As a result of this configuration, the power feeding coil unit 130 of the wireless power feeding device 100 and the power receiving coil unit 210 of the wireless power receiving device 200 are magnetically coupled when positioned facing each other. Thus, owing to the near-field transmission effect, an induced electromotive force is excited in the power receiving coil unit 210 by the AC power supplied from the power conversion circuit 120 to the power feeding coil unit 130. That is, the above configuration provides the wireless power transmission device S1 in which power is transmitted from the wireless power feeding device 100 to the wireless power receiving device 200 in a contactless manner.

The description now proceeds to the configurations of coil units according to preferred embodiments of the present invention that are used as the power feeding coil unit 130 or the power receiving coil unit 210 mentioned above.

First Embodiment

Figure 2:
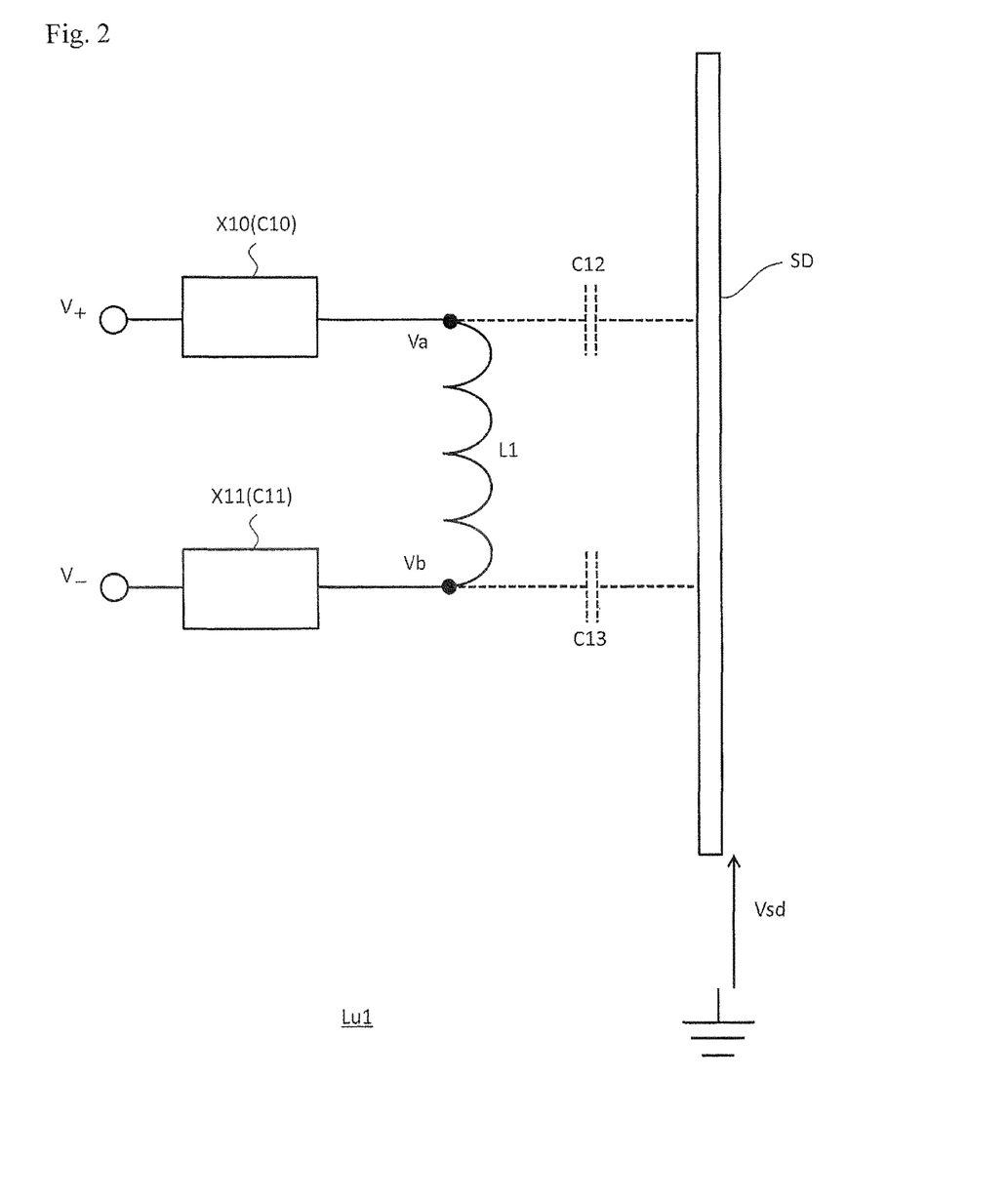
FIG. 2 schematically illustrates the circuit configuration of a coil unit according to a first embodiment of the present invention.
Figure 3A:
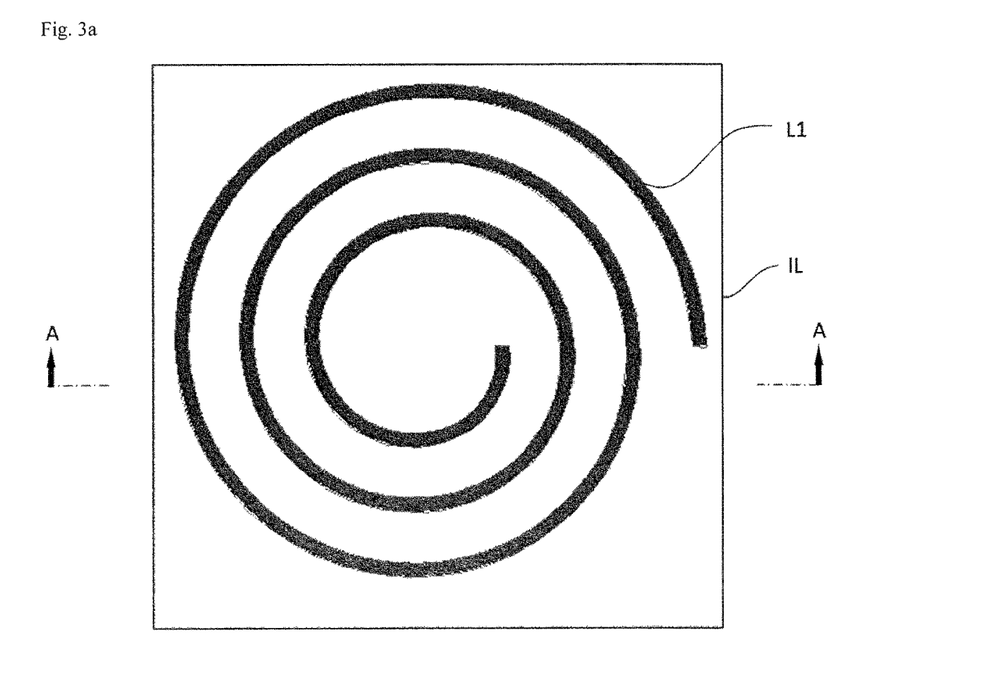
FIG. 3*a* is a plan view of the coil unit according to the first embodiment of the present invention.
Figure 3B:
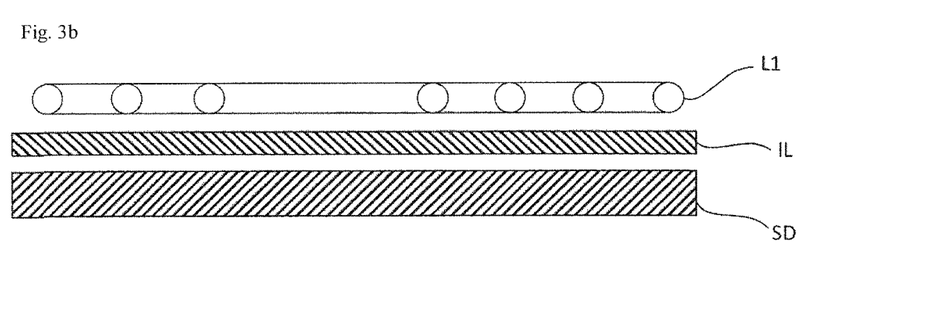
FIG. 3*b* is a cross-sectional view of the coil unit taken along a cutting-plane line A-A in FIG. 3*a*.

Referring to FIGS. 2 and 3, a coil unit Lu1 according to a first embodiment of the present invention will be described in detail. FIG. 2 schematically illustrates the circuit configuration of the coil unit according to the first embodiment of the present invention. FIG. 3a is a plan view of the coil unit according to the first embodiment of the present invention. FIG. 3b is a cross-sectional view of the coil unit taken along a cutting-plane line A-A in FIG. 3a For the convenience of explanation, a reactance circuits is not illustrated in FIG. 3b.

As illustrated in FIG. 2, the coil unit Lu1 has a power transmission coil L1, a metal part SD, and a reactance circuit X.

The power transmission coil L1 is constructed of a winding of Litz wire including multiple thin conductor strands twisted together. Specifically, as illustrated in FIG. 3a, the power transmission coil L1 is a coil of a planar spiral structure with a substantially circular shape. The number of turns in the power transmission coil L1 is set as appropriate based on various factors, such as the separation distance from the coil that is to be positioned facing the power transmission coil L1 during power transmission, and the desired power transmission efficiency. If the power transmission coil L1 is used as the power feeding coil unit 130 of the wireless power transmission device S1, the power transmission coil L1 functions as a power feeding section, and if the power transmission coil L1 is used as the power receiving coil unit 210 of the wireless power transmission device S1, the power transmission coil L1 functions as a power receiving section.

As illustrated in FIG. 3b, the metal part SD, which has the outward shape of a substantially rectangular parallelepiped, is disposed on the same side as the back side of the power transmission coil L1. Specifically, if the power transmission coil L1 is used as the power feeding coil unit 130, the metal part SD is located farther from the power receiving coil unit 210 than is the power transmission coil L1 in a direction in which the power feeding coil unit 130 and the power receiving coil unit 210 are positioned facing each other. If the power transmission coil L1 is used as the power receiving coil unit 210, the metal part SD is located farther from the power feeding coil unit 130 than is the power transmission coil L1 in a direction in which the power feeding coil unit 130 and the power receiving coil unit 210 are positioned facing each other. In other words, the metal part SD is disposed on the side opposite to the side of the power transmission coil L1 where power transmission takes place during power transmission. That is, the coil axis of the power transmission coil L1 is orthogonal to the principal surface of the metal part SD. The metal part SD is made of a conductive material, and acts to absorb electromagnetic waves. That is, the metal part SD serves as a shield member. The metal part SD may be, for example, aluminum, copper, or silver. The metal part SD may be non-magnetic. As for the electrical conductivity of the metal part SD, the higher, the more preferable. As a result of this configuration, a parasitic capacitance C12 is formed between one end of the winding of the power transmission coil L1 and the metal part SD, and a parasitic capacitance C13 is formed between the other end of the winding of the power transmission coil L1 and the metal part SD as illustrated in FIG. 2. In the first embodiment, an insulating member IL is provided between the power transmission coil L1 and the metal part SD. In this case, insulation between the power transmission coil L1 and the metal part SD is ensured, thus preventing a short circuit at both ends of the power transmission coil L1. Instead of the insulating member IL, a gap may be provided between the power transmission coil L1 and the metal part SD.

The reactance circuit X forms a resonant circuit together with the power transmission coil. The reactance circuit X has the function of adjusting the resonance frequency of the resonant circuit. Specifically, the reactance circuit X has a first reactance circuit X10, and a second reactance circuit X11.

As illustrated in FIG. 2, the first reactance circuit X10 is connected to one end of the winding of the power transmission coil L1. That is, the first reactance circuit X10 is connected in series with the power transmission coil L1. The first reactance circuit X10 is constructed of a resonant capacitor C10. Although the first reactance circuit X10 is constructed of the resonant capacitor C10 in the first embodiment, this is not intended to be limitative. An inductor may be connected in series or parallel with the resonant capacitor C10.

As illustrated in FIG. 2, the second reactance circuit X11 is connected to the other end of the winding of the power transmission coil L1. That is, the second reactance circuit X11 is connected in series with the power transmission coil L1. The second reactance circuit X11 is constructed of a resonant capacitor C13. Although the second reactance circuit X11 is constructed of the resonant capacitor C13 in the first embodiment, this is not intended to be limitative. An inductor may be connected in series or parallel with the resonant capacitor C13.

As described above, the parasitic capacitances C12 and C13 are formed between the power transmission coil L1 and the metal part SD. A difference between the parasitic capacitances C12 and C13 leads to a difference in potential between an induced voltage generated via the parasitic capacitance C12 between one end of the winding of the power transmission coil L1 and the metal part SD, and an induced voltage generated via the parasitic capacitance C13 between the other end of the winding of the power transmission coil L1 and the metal part SD. As a result, high voltage is generated on the metal part SD. The present invention aims to reduce high voltage induced on the metal part SD.

Through their extensive research, the present inventors have found that a difference in potential between voltages induced on the metal part SD due to a variation between the parasitic capacitances C12 and C13 can be cancelled out by adjusting the ratio between the respective reactance values of the first reactance circuit X10 and the second reactance circuit X11. Specifically, in the first embodiment, the ratio of the second reactance value of the second reactance circuit X11 to the first reactance value of the first reactance circuit X10 is set based on the ratio of the mean distance between the winding and the metal part SD in a part of the winding from the other end to the central portion to the mean distance between the winding and the metal part SD in a part of the winding from one end to the central portion. As for the voltage generated on the metal part SD at this time, the difference between the value of voltage induced on the metal part SD via the parasitic capacitance C12 created between the winding and the metal part SD in the part of the winding of the power transmission coil L1 from one end to the central portion, and the value of voltage applied across the first reactance circuit X10, and the difference between the value of voltage induced on the metal part SD via the parasitic capacitance C13 created between the winding and the metal part SD in the part of the winding of the power transmission coil L1 from the other end to the central portion, and the value of voltage applied across the second reactance circuit X11 are induced. Therefore, the voltage induced on the metal part SD can be reduced by reducing the difference between the value of voltage induced on the metal part SD via the parasitic capacitance C12 created between the winding and the metal part SD in the part of the winding of the power transmission coil. L1 from one end to the central portion, and the value of voltage applied across the first reactance circuit X10, and the difference between the value of voltage induced on the metal part SD via the parasitic capacitance C13 created between the winding and the metal part SD in the part of the winding of the power transmission coil L1 from the other end to the central portion, and the value of voltage applied across the second reactance circuit X11. The mean distance between the winding and the metal part SD in the part of the winding from one end to the central portion refers to a value obtained by calculating, at different positions along the part of the winding from one end to the central portion, a plurality of values of the shortest distance between the outer surface part of the winding located closest to the metal part SD and the outer surface part of the metal part SD located on the same side as the winding, and averaging the calculated values. Likewise, the mean distance between the winding and the metal part SD in the part of the winding from the other end to the central portion refers to a value obtained by calculating, at different positions along the part of the winding from the other end to the central portion, a plurality of values of the shortest distance between the outer surface part of the winding located closest to the metal part SD and the outer surface part of the metal part SD located on the same side as the winding, and averaging the calculated values.

For example, if the parasitic capacitance C12 is greater than the parasitic capacitance C13, this means that the mean distance between the winding and the metal part SD in the part of the winding from one end to the central portion is less than the mean distance between the winding and the metal part SD in the part of the winding from the other end to the central portion. In this case, if the first reactance value of the first reactance circuit X10 is reduced relative to the second reactance value of the second reactance circuit X11, the difference between the value of voltage induced on the metal part SD via the parasitic capacitance C12 created between the winding and the metal part SD in the part of the winding of the power transmission coil L1 from one end to the central portion, and the value of voltage applied across the first reactance circuit X10 decreases, and the difference between the value of voltage induced on the metal part SD via the parasitic capacitance C13 created between the winding and the metal part SD in the part of the winding of the power transmission coil L1 from the other end to the central portion, and the value of voltage applied across the second reactance circuit X11 decreases. Conversely, if the parasitic capacitance C12 is less than the parasitic capacitance C13, this means that the mean distance between the winding and the metal part SD in the part of the winding from one end to the central portion is greater than the mean distance between the winding and the metal part SD in the part of the winding from the other end to the central portion. In this case, if the first reactance value of the first reactance circuit X10 is increased relative to the second reactance value of the second reactance circuit X11, the difference between the value of voltage induced on the metal part SD via the parasitic capacitance C12 created between the winding and the metal part SD in the part of the winding of the power transmission coil L1 from one end to the central portion, and the value of voltage applied across the first reactance circuit X10 decreases, and the difference between the value of voltage induced on the metal part SD via the parasitic capacitance C13 created between the winding and the metal part SD in the part of the winding of the power transmission coil L1 from the other end to the central portion, and the value of voltage applied across the second reactance circuit X11 decreases.

In this way, a difference in potential between voltages induced on the metal part SD due to a variation between the parasitic capacitances C12 and C13 can be cancelled out by adjusting the ratio between the respective reactance values of the first reactance circuit X10 and the second reactance circuit X11.

A ratio M of the second reactance value to the first reactance value is preferably set so as to satisfy Equations (1) and (2) below:

$$M = (1-\alpha)/(1+\alpha) \hspace{2cm} \text{Equation (1)}$$

$$\alpha = \{(n-1)/(n+1)\} \cdot (f/f_0)^2 \hspace{2cm} \text{Equation (2)}$$

where n denotes the ratio of the mean distance between the winding and the metal part SD in the part of the winding from the other end to the central portion to the mean distance between the winding and the metal part SD in the part of the winding from one end to the central portion, f denotes the frequency of an alternating current that passes through the power transmission coil L1 during power transmission, and $f_0$ denotes the resonance frequency of the resonant circuit.

In this case, the difference between the value of voltage induced on the metal part via the parasitic capacitance C12 created between the winding and the metal part in the part of the winding of the power transmission coil L1 from one end to the central portion, and the value of voltage applied across the first reactance circuit X10 approaches zero without limit, and the difference between the value of voltage induced on the metal part via the parasitic capacitance C13 created between the winding and the metal part SD in the part of the winding of the power transmission coil L1 from the other end to the central portion, and the value of voltage applied across the second reactance circuit X11 approaches zero without limit. As a result, high voltage induced on the metal part SD can be further reduced.

The following provides a detailed description of the principle behind why satisfying the conditions of Equations (1) and (2) mentioned above makes it possible to further reduce high voltage induced on the metal part. For the convenience of explanation, it is assumed that the first reactance circuit X10 is the resonant capacitor C10, and that the second reactance circuit X11 is the resonant capacitor C11. That is, a first reactance value X100 of the first reactance circuit X10 satisfies Equation (3) below, and a second reactance value X110 of the second reactance circuit X11 satisfies Equation (4) below:

$$X100 = 1/(j \cdot \omega \cdot C100) \hspace{2cm} \text{Equation (3)}$$

$$X110 = 1/(j \cdot \omega \cdot C110) \hspace{2cm} \text{Equation (4)}$$

where C100 is the capacitance value of the resonant capacitor C10, and C110 is the capacitance value of the resonant capacitor C11.

That is, from Equation (3) and Equation (4) above, the ratio M of the second reactance value X110 to the first reactance value X100 is given by Equation (5).

$$M = C100/C110 \hspace{2cm} \text{Equation (5)}$$

In the first embodiment, the reactance ratio M is set in order to reduce induced voltage on the metal part SD. The following describes parameters necessary for setting the reactance ratio M.

First, various characteristics of the resonant circuit will be described. Using Equation (5) above, the capacitance value C100 of the resonant capacitor C10 is represented as Equation (6). Further, the combined capacitance value C of the resonant capacitor C10 and the resonant capacitor C11 is given by Equation (7).

$$C100 = M \cdot C110 \quad \text{Equation (6)}$$

$$C = M/(M+1) \cdot C110 \quad \text{Equation (7)}$$

Further, using Equation (7), the inductance value L100 of the power transmission coil L1 is given as Equation (8):

$$L100 = 1/\{(2\pi f_0)^2 \cdot C\} \quad \text{Equation (8)}$$

where $f_0$ is the resonance frequency of the resonant circuit.

Next, the parasitic capacitances C12 and C13 created between the power transmission coil L1 and the metal part SD will be described. The values of the parasitic capacitances C12 and C13 are inversely proportional to the distance between the power transmission coil L1 and the metal part SD. Accordingly, the relationship between a value C120 of the parasitic capacitance C12 and a value C130 of the parasitic capacitance C13 is represented by Equation (9) below:

$$C130 = n \cdot C120 \quad \text{Equation (9)}$$

where n is the ratio of the mean distance between the winding and the metal part SD in the part of the winding from the other end to the central portion to the mean distance between the winding and the metal part SD in the part of the winding from one end to the central portion.

Next, induced voltage on the metal part SD will be described. The value of an induced voltage is determined by the voltage division ratio between the voltage across the power transmission coil L1 and the parasitic capacitances C12 and C13. Accordingly, an induced voltage Vsd is given by Equation (10):

$$Vsd = |Vb + (Va - Vb) \cdot C120/(C120 + C130)| \quad \text{Equation (10)}$$

where Va is the voltage at one end of the power transmission coil L1, and Vb is the voltage at the other end of the power transmission coil L1.

Now, the voltage Va at one end of the power transmission coil L1 is given by Equation (11):

$$Va = V_+ + (V_+ - V_-) \cdot (\omega \cdot C100 - \omega^3 \cdot L100 \cdot C100 \cdot C110)/(\omega \cdot C100 + \omega \cdot 110 - \omega^3 \cdot L100 \cdot C100 \cdot C110) \quad \text{Equation (11)}$$

where $V_+$ and $V_-$ are voltages applied to the resonant circuit (of which $V_+$ is the voltage applied to an end portion of the resonant capacitor C10, and $V_-$ is the voltage applied to an end portion of the resonant capacitor C11), and f is the frequency of an alternating current that passes through the power transmission coil L1 during power transmission.

Likewise, the voltage Vb at the other end of the power transmission coil L1 is given by Equation (12).

$$Vb = V_+ + (V_+ - V_-) \cdot \omega \cdot C100/(\omega \cdot C100 + \omega \cdot C110 - \omega^3 \cdot L100 \cdot C100 \cdot C110) \quad \text{Equation (12)}$$

Substituting Equations (6), (8), (9), (11), and (12) into Equation (10) yields Equation (13).

$$Vsd = V_+ \cdot \{-(n+1) \cdot (1+M) \cdot (1-\omega^2/\omega_0^2) + 2 \cdot (nM-1) \cdot \omega^2/\omega_0^2\}/\{(n+1) \cdot (1+M) \cdot (1-\omega^2/\omega_0^2)\} \quad \text{Equation (13)}$$

From Equation (13), the reactance ratio M is obtained as Equation (14).

$$M = [\{n + (n+1) \cdot Vsd/V_+\} \cdot \{1 - (f/f_0)^2\} + \{1 + (f/f_0)^2\}]/[\{1 - (n+1) \cdot Vsd/V_+\}\{1 - (f/f_0)^2\} + n \cdot \{1 + (f/f_0)^2\}] \quad \text{Equation (14)}$$

From the above discussion, in order to reduce induced voltage on the metal part SD, the induced voltage Vsd in Equation (14) may be set as Vsd=0. Substituting Vsd=0 into Equation (14) gives Equations (1) and (2). Therefore, induced voltage on the metal part SD can be reduced by setting the reactance ratio M such that Equations (1) and (2) are satisfied.

$$M = (1-\alpha)/(1+\alpha) \quad \text{Equation (1)}$$

$$\alpha = \{(n-1)/(n+1)\} \cdot (f/f_0)^2 \quad \text{Equation (2)}$$

As described above, in the coil unit Lu1 according to the first embodiment, the reactance circuit has the first reactance circuit connected to one end of the winding of the power transmission coil, and the second reactance circuit connected to the other end of the winding of the power transmission coil. The ratio of the second reactance value of the second reactance circuit to the first reactance value of the first reactance circuit is set based on the ratio of the mean distance between the winding and the metal part in the part of the winding from the other end to the central portion to the mean distance between the winding and the metal part in the part of the winding from one end to the central portion. This results in a smaller difference between the value of voltage induced on the metal part via the parasitic capacitance created between the winding and the metal part in the part of the winding of the power transmission coil from one end to the central portion, and the value of voltage applied across the first reactance circuit, and a smaller difference between the value of voltage induced on the metal part via the parasitic capacitance created between the winding and the metal part in the part of the winding of the power transmission coil from the other end to the central portion, and the value of voltage applied across the second reactance circuit. As a result, high voltage induced on the metal part can be reduced.

In the coil unit Lu1 according to the first embodiment according to the first embodiment, the ratio M of the second reactance value to the first reactance value is set so as to satisfy Equations (1) and (2) below:

$$M = (1+\alpha)/(1-\alpha) \quad \text{Equation (1)}$$

$$\alpha = \{(n-1)/(n+1)\} \cdot (f/f_0)^2 \quad \text{Equation (2)}$$

where n denotes the ratio of the mean distance between the winding and the metal part in the part of the winding from the other end to the central portion to the mean distance between the winding and the metal part in the part of the winding from one end to the central portion, f denotes the frequency of an alternating current that passes through the power transmission coil during power transmission, and $f_0$ denotes the resonance frequency of the resonant circuit.

Consequently, the difference between the value of voltage induced on the metal part via the parasitic capacitance created between the winding and the metal part in the part of the winding of the power transmission coil from one end to the central portion, and the value of voltage applied across the first reactance circuit approaches zero without limit, and the difference between the value of voltage induced on the metal part via the parasitic capacitance created between the winding and the metal part in the part of the winding of the power transmission coil from the other end to the central portion, and the value of voltage applied across the second reactance circuit approaches zero without limit. As a result, high voltage induced on the metal part can be reduced.

Second Embodiment

Figure 4A:
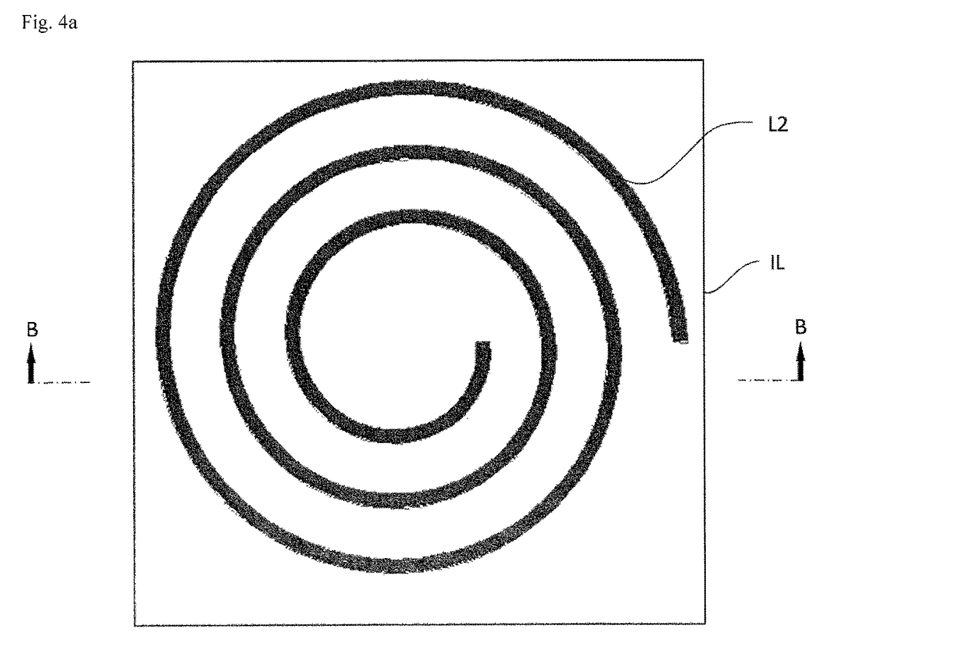
FIG. 4*a* is a plan view of a coil unit according to a second embodiment of the present invention.
Figure 4B:
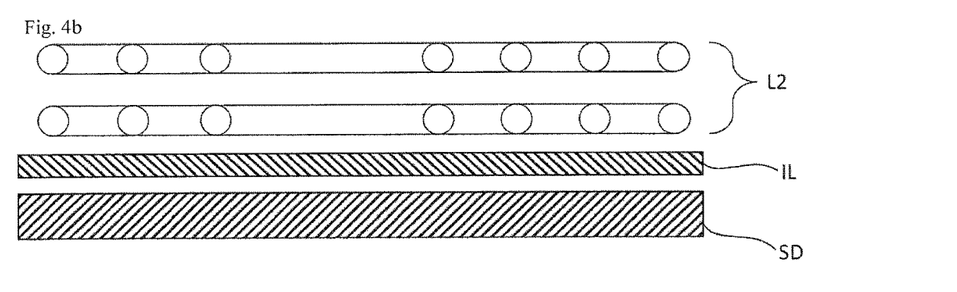
FIG. 4*b* is a cross-sectional view of the coil unit taken along a cutting-plane line B-B in FIG. 4*a*.

Next, a coil unit according to a second embodiment of the present invention will be described with reference to FIG. 4. FIG. 4a is a plan view of the coil unit according to the second embodiment of the present invention. FIG. 4b is a cross-sectional view of the coil unit taken along a cutting-plane line B-B in FIG. 4a. For the convenience of explanation, the reactance circuits X10 and X11 are not illustrated in FIG. 4b. The coil unit according to the second embodiment differs from the coil unit Lu1 according to the first embodiment in that this coil unit includes a power transmission coil L2 instead of the power transmission coil L1. The following description will mainly focus on differences from the first embodiment. Since the metal part SD and the reactance circuits X10 and X11 are configured in the same manner as those of the coil unit Lu1 according to the first embodiment, a description of these components will be omitted.

As illustrated in FIG. 4a, the power transmission coil L2 is a coil of a planar spiral structure with a substantially circular shape. The number of turns in the power transmission coil L2 is set as appropriate based on various factors, such as the separation distance from the coil that is to be positioned facing the power transmission coil L2 during power transmission, and the desired power transmission efficiency. In the second embodiment, the winding of the power transmission coil L2 is wound continuously in a layered manner as illustrated in FIG. 4b. Specifically, the winding is wound continuously in a layered manner such that one end of the winding is located in the layer farthest from the metal part. In the second embodiment, the power transmission coil L2 is a coil with a two-layer winding structure in which the winding of the first layer and then the winding of the second layer are wound in the stated order as viewed from the metal part SD. At this time, the end edge of the winding of the first layer and the starting edge of the winding of the second layer are coupled, thus providing the power transmission coil L2 with a winding that is wound continuously in a layered manner. Although the power transmission coil L2 is wound such that the winding of the first layer and the winding of the second layer are wound in the stated order as viewed from the metal part SD in the second embodiment, this is not intended to be limitative. The winding may be wound such that the second layer of the power transmission coil L2 is located closer to the metal part SD than is the first layer.

In the power transmission coil L2, the reactance circuit X10 (first reactance circuit) is connected to an end portion of the winding in the layer closest to the metal part SD. That is, in the second embodiment, the reactance circuit X10 (first reactance circuit) is connected to an end portion of the first layer of winding of the power transmission coil L2. Furthermore, in the power transmission coil L2, the reactance circuit X11 (second reactance circuit) is connected to an end portion of the winding in the layer farthest from the metal part SD. That is, in the second embodiment, the reactance circuit X11 (second reactance circuit) is connected to an end portion of the second layer of winding of the power transmission coil L2.

As described above, in the coil unit according to the second embodiment, the power transmission coil L2 has a winding that is wound continuously in a layered manner. As a result, the inductance value of the coil can be improved while reducing high voltage induced on the metal part.

Hereinafter, reduction of high induced voltage on the metal part SD and adjustment of the reactance value of the reactance circuit according to the embodiments mentioned above will be described in more specific detail by way of Examples 1 and 2 and Comparative Example 1.

As Examples 1 and 2, the coil unit Lu1 according to the first embodiment was used with the ratio n set to 1.5 times, the ratio n being the ratio of the mean distance between the winding and the metal part SD in the part of the winding from the other end to the central portion to the mean distance between the winding and the metal part SD in the part of the winding from one end to the central portion. The second reactance value of the second reactance circuit X11 according to Example 1 was set to 1.55 times the first reactance value of the first reactance circuit X10, based on the ratio n of the mean distance between the winding and the metal part SD in the part of the winding from the other end to the central portion to the mean distance between the winding and the metal part SD in the part of the winding from one end to the central portion. Further, the second reactance value of the second reactance circuit X11 according to Example 2 was set to 1.6 times the first reactance value of the first reactance circuit X10, based on the ratio n of the mean distance between the winding and the metal part SD in the part of the winding from the other end to the central portion to the mean distance between the winding and the metal part SD in the part of the winding from one end to the central portion. The coil unit that was used as Comparative Example 1 for comparison of its characteristics with Examples 1 and 2 is the coil unit Lu1 according to the first embodiment with the ratio n set to 1.5 times, the ratio n being the ratio of the mean distance between the winding and the metal part SD in the part of the winding from the other end to the central portion to the mean distance between the winding and the metal part SD in the part of the winding from one end to the central portion, in which only the first reactance circuit X10 is connected to one end of the winding of the power transmission coil L1. In Examples 1 and 2 and Comparative Example 1, a single-layer coil was used as a power transmission coil.

Subsequently, as for the voltage to be applied in Examples 1 and 2 and Comparative Example 1, the power transmission coil was applied with an AC voltage of 400 V at which the frequency of alternating current passing through the power transmission coil during power transmission is 90 kHz, and the induced voltage on the metal part SD was measured. At this time, the induced voltage on the metal part SD was measured by using a digital multimeter. The positive-side terminal of the digital multimeter was connected to the metal part SD, and the negative terminal was connected to the earth. Voltages above the rated voltage of the digital multimeter were measured through resistance voltage division.

The measurement results according to Examples 1 and 2 and Comparative Example 1 are presented in Table 1.

TABLE 1

|  | Mean distance ratio n (times) | Reactance ratio M (times) | Induced voltage applied to metal part [V] |
|---|---|---|---|
| Example 1 | 1.5 | 1.55 | 28.5 |
| Example 2 |  | 1.60 | 22.2 |
| Comparative Example 1 |  | — | 2430 |

It is appreciated from Table 1 that although an induced voltage of 2430 [V] was applied to the metal part in Comparative Example 1, the applied voltage was reduced to 28.5 [V] in Example 1 and to 22.2 [V] in Example 2. That is, it was confirmed that setting the reactance value of the second reactance circuit X11 as in Examples 1 and 2 makes it possible to reduce high voltage induced on the metal part SD.

REFERENCE SIGNS LIST 100 wireless power feeding device, 110 power source, 120 power conversion circuit, 121 power conversion section, 122 switch driving section, 130 power feeding coil unit, 200 wireless power receiving device, 210 power receiving coil unit, 220 rectification section, C0 smoothing capacitor, C10, C11 resonant capacitor, C12, C13 parasitic capacitance, D1 to D4 diode, L1, L2 power transmission coil, Lu1 coil unit, RL load, S1 wireless power transmission device, SG1 to SG4 SW control signal, SW1 to SW4 switching element, X10 first reactance circuit, X11 second reactance circuit.

What is claimed is:

1. A coil unit comprising:
a power transmission coil;
a reactance circuit that forms a resonant circuit together with the power transmission coil; and
a metal part disposed on a same side as a back side of the power transmission coil,
wherein the reactance circuit has a first reactance circuit connected to one end of a winding of the power transmission coil, and a second reactance circuit connected to another end of the winding of the power transmission coil,
a ratio of a second reactance value of the second reactance circuit to a first reactance value of the first reactance circuit is set based on a ratio of a mean distance between the winding and the metal part in a part of the winding from the one end to a central portion to a mean distance between the winding and the metal part in a part of the winding from the other end to the central portion, and
a ratio M of the second reactance value to the first reactance value is set so as to satisfy Equations (1) and (2) below:

$$M=(1+\alpha)/(1-\alpha) \qquad \text{Equation (1)}$$

$$\alpha=\{(n-1)/(n+1)\}\cdot(f/f_0)^2 \qquad \text{Equation (2)}$$

where n denotes the ratio of the mean distance between the winding and the metal part in the part of the winding from the other end to the central portion to the mean distance between the winding and the metal part in the part of the winding from the one end to the central portion, f denotes a frequency of an alternating current that passes through the power transmission coil during power transmission, and $f_0$ denotes a resonance frequency of the resonant circuit.

2. The coil unit according to claim 1, wherein the winding of the power transmission coil is wound continuously in a layered manner.

3. A wireless power feeding device comprising
a power feeding coil unit,
wherein the power feeding coil unit is the coil unit according to claim 1.

4. A wireless power receiving device comprising
a power receiving coil unit,
wherein the power receiving coil unit is the coil unit according to claim 1.

5. A wireless power transmission device comprising:
a wireless power feeding device having a power feeding coil unit; and
a wireless power receiving device having a power receiving coil unit,
wherein at least one of the power feeding coil unit and the power receiving coil unit is the coil unit according to claim 1.

* * * * *